United States Patent [19]

Yasui et al.

[11] Patent Number: 5,034,887
[45] Date of Patent: Jul. 23, 1991

[54] MICROPROCESSOR WITH HARVARD ARCHITECTURE

[75] Inventors: Ikuo Yasui; Yukihiko Shimazu, both of Itami, Japan

[73] Assignee: Mitsubishi Denki Kabushiki Kaisha, Tokyo, Japan

[21] Appl. No.: 560,246

[22] Filed: Jul. 27, 1990

Related U.S. Application Data

[63] Continuation of Ser. No. 156,397, Feb. 16, 1988, abandoned.

[30] Foreign Application Priority Data

Jul. 8, 1987 [JP] Japan ................. 62-171598

[51] Int. Cl.⁵ ............... G06F 12/00; G06F 13/00
[52] U.S. Cl. .................. 364/200; 364/228.1; 364/246.2; 364/232.8; 364/243.3; 364/251.3
[58] Field of Search ........... 364/200 MS, 900 MS; 365/230.01, 230.04, 230.05, 189.04

[56] References Cited

U.S. PATENT DOCUMENTS

| | | | |
|---|---|---|---|
| 4,171,536 | 10/1979 | Heuer et al. | 364/200 |
| 4,376,975 | 3/1983 | Comfort et al. | 364/200 |
| 4,476,526 | 10/1984 | Dodd | 364/200 |
| 4,528,648 | 7/1985 | Lew | 365/236 |
| 4,541,076 | 9/1985 | Bowers et al. | 365/190 |
| 4,945,473 | 7/1990 | Holtey et al. | 364/200 |

OTHER PUBLICATIONS

IBM Technical Disclosure Bulletin vol. 28, No. 3, Aug. 1985, pp. 1169-1174.
Texas Instruments Brochure No. SPRV006 Texas Instruments Incorporated, 1986, (TMS320C25) Digital Signal Processor.

Primary Examiner—Michael R. Fleming
Assistant Examiner—Gopal C. Ray
Attorney, Agent, or Firm—Townsend and Townsend

[57] ABSTRACT

A microprocessor utilizing Harvard Architecture is disclosed with a data space for data storage, an instruction space for instruction storage, and a common space implemented as a high-speed on-chip RAM that functions as a continuous extension of both the data space and the instruction space, for the simultaneous and flexible storage of data and instructions.

13 Claims, 15 Drawing Sheets

* LOCATED IN COMMON MEMORY
( ) INHIBITED FETCH
+ DATA LOCATED IN COMMON MEMORY

MICROPROCESSOR WITH HARVARD ARCHITECTURE

This is a continuation of application Ser. No. 156,397, filed Feb. 16, 1988, now abandoned.

BACKGROUND OF THE INVENTION

This invention relates generally to a microprocessor and more particularly to a microprocessor utilizing a memory with an instruction space and a data space, where the spaces operate somewhat independently of each other so the microprocessor can perform fetches and execution of instructions and data simultaneously. This type of microprocessor architecture is commonly referred to as "Harvard Architecture". Generally, the type of microprocessor that utilizes Harvard Architecture is a digital signal processor (to be hereinafter called "DSP").

In such a DSP, both the instruction memory and the data memory utilize either read only memory (to be hereinafter called "ROM") or random access memory (to be hereinafter called "RAM"). The RAM or ROM may be located at the interior (on the DSP chip) or exterior of the DSP.

Generally, since the DSP requires high-speed processing capability, high-speed memory must be utilized. High-speed external RAM or ROM is relatively expensive. Although internal ROM is fast, it requires that the DSP must be customized, resulting in high manufacturing costs and a low production quantity. Therefore, it is proposed for high-speed processing and low manufacturing cost to incorporate internal RAM on the DSP chip. However, internal RAM on a DSP chip is limited in capacity. Therefore, there is a need that the RAM be effectively utilized.

One method for a DSP to utilize Harvard Architecture is shown in FIG. 1. An internal RAM 300 is divided into three memory blocks B0, B1, and B2. Blocks B1 and B2 are used only as data memory. Block B0 can be used as either data memory or as program (instruction) memory.

FIGS. 2 and 3 are memory maps (they show the allocation of memory) of the program memory 103, data memory 102, and I/O address memory 105 for this method. FIG. 2 shows the allocation of memory when block B0 is defined as data memory. FIG. 3 shows the allocation of memory when block B0 is defined as program memory.

Small programs requiring rapid execution can be stored inexpensively in block B0, yet be executed at high speed. However, to load a program onto block B0 as program memory requires several steps. Block B0 must first be defined as data memory by using a block definition instruction. The program must then be transferred from external memory to block B0 by using block transfer instructions. Finally, block B0 must be defined as program memory by using another block definition instruction.

A disadvantage of this example is its limited flexibility. Blocks B1 and B2 can only be used as data memory. Block B0 can be used as either data memory or program memory, but it can not be partitioned to store data and instructions. This limited flexibility results in the poor utilization of the limited capacity internal RAM.

SUMMARY OF THE INVENTION

This invention relates to a DSP that utilizes Harvard Architecture. This invention includes an internal RAM where a portion of that internal RAM (herein called "common space") can be used as either data space or instruction space. Additionally, the common space can be used as both data space and instruction space by partitioning into two parts. Therefore, the common space is extremely flexible, resulting in the effective utilization of the limited capacity internal RAM.

However, because both instructions and data are fetched simultaneously under Harvard Architecture, the common space could receive conflicting data and instruction fetches unless the instructions were written to prevent this from occurring. Therefore, several preferred embodiments for handling these conflicting fetches of the common space are described.

A first preferred embodiment uses a coincidence detection unit to determine when a fetch conflict occurs. Upon detection of a conflict, a chip controller allows the instruction to be fetched while the data is not fetched. Instead, the data is set to a predetermined fixed value (e.g., all 0's) as a signal to the program that a conflict has occurred.

A second preferred embodiment also uses a coincidence detection unit to determine when a fetch conflict occurs. Upon detection of a conflict, a chip controller allows the data to be fetched first while the instruction fetch is delayed one clock cycle. Therefore, fetches of data or instructions are delayed only if both the data and instruction to be fetched are located on the common space, while the advantages of a flexible common space are retained.

A third preferred embodiment uses a time-sharing method. Data is fetched in the first half of a clock cycle while instructions are fetched in the second half of a clock cycle. As a result, there is no delay in the fetching of data or instructions while retaining the advantages of a flexible common space.

A fourth preferred embodiment utilizes a two-port common space so both data and instructions can be fetched simultaneously. As with the second embodiment, there is no delay in the fetching of data or instructions while retaining the advantages of a flexible common space.

DESCRIPTION OF THE PREFERRED EMBODIMENTS

The preferred embodiments of the present invention will now be described with reference to the drawings.

Figure 1:
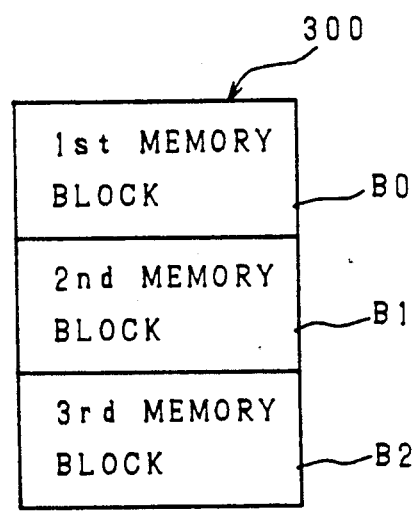
FIG. 1 is a logical view of the RAM for a DSP utilizing Harvard Architecture.
Figure 2:
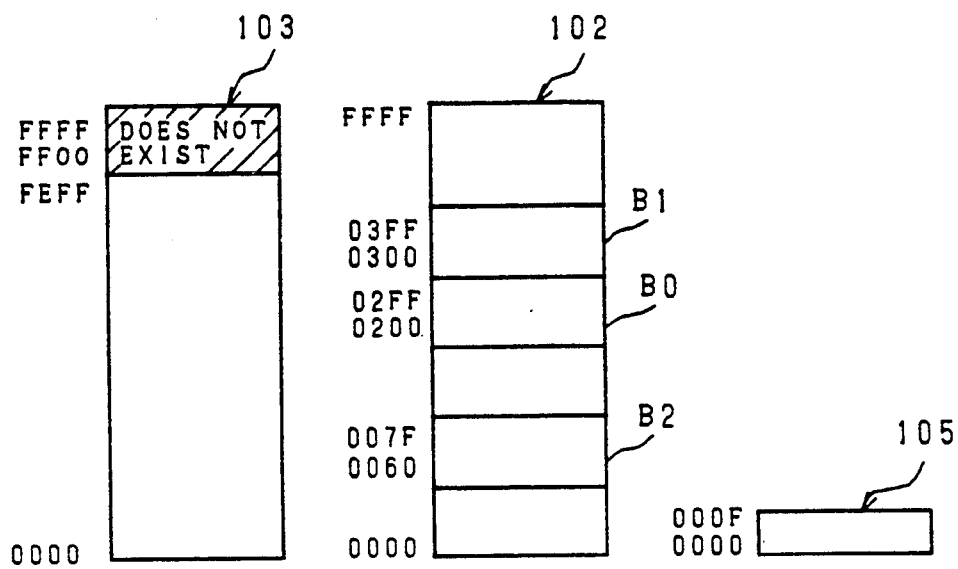
FIGS. 2 and 3 are memory maps illustrating the allocation of memory for the RAM shown in FIG. 1.
Figure 3:
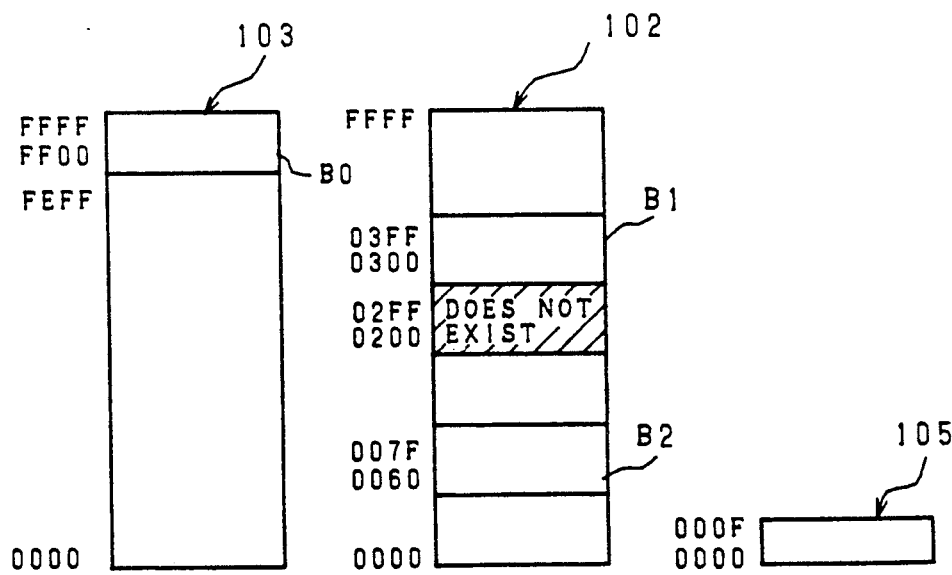
Figure 4A:
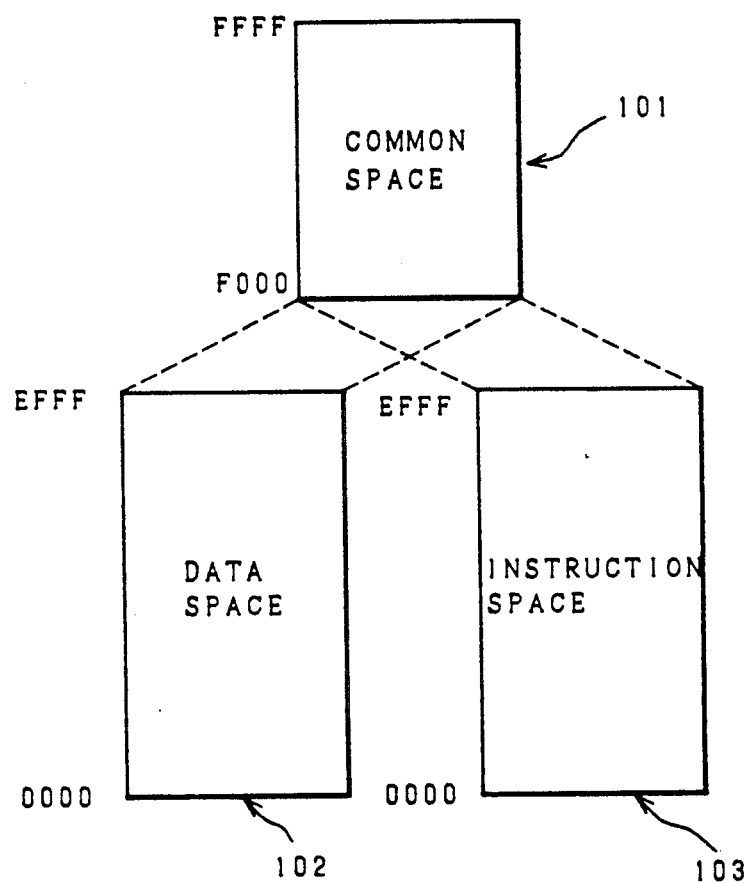
FIGS. 4A and 4B are memory maps showing the allocation of memory for the invention.
Figure 4B:
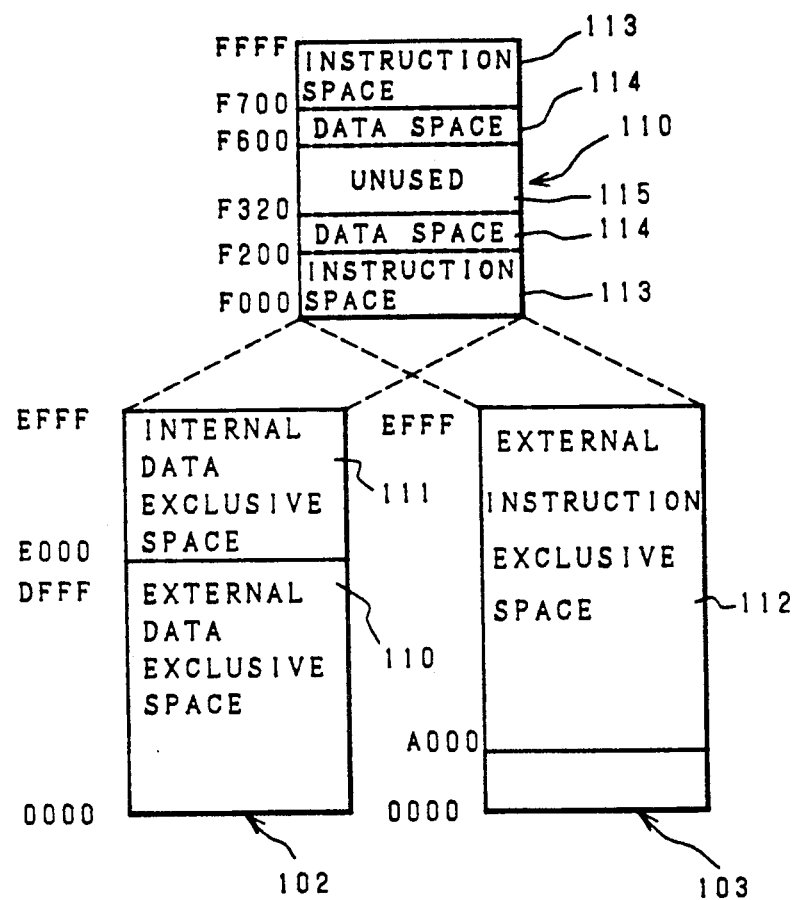

FIGS. 4A and 4B are memory maps showing the allocation of memory for the invention.

As shown in FIG. 4A, the invention has three memory spaces. An instruction space 103 from address 0000h (h: hexadecimal digit) to address EFFFh is used to store instructions for execution. A data space 102 from address 0000h to address EFFFh is used to store data used by the instructions. A common space 101 from address F000h to address FFFFh is used as an extension of both the instruction space and the data space. As a result, instructions stored on the common space are still in the instruction space, and data stored in the common space are still in the data space. In addition, both instructions and data can be stored on the common space at the same time.

FIG. 4B shows the memory map for the invention in more detail. The data space contains an external data exclusive space 110 and an internal data exclusive data space 111. The external data exclusive space is memory located external to the DSP that is used for data storage only. The internal data exclusive space is memory located on the DSP chip that is used for data storage only. The external exclusive data space need not be utilized if the internal exclusive data space and the common space contain sufficient capacity to store needed data. The instruction space contains an external instruction exclusive space 112 that is used for instruction storage only. The external exclusive instruction space need' not be utilized if the common space contains sufficient capacity to store needed data.

The common space is shown with data and instructions stored at various addresses in the common space. Extensions to the instruction space 113 are shown from address F000h to address F1FFh and from address F700h to address FFFFh. Extensions to the data space 114 are shown from address F200h to address F31Fh and from address F600h to address F6FFh. The unused common space 115 is shown from address F320h to address F5FFh.

Figure 5A:
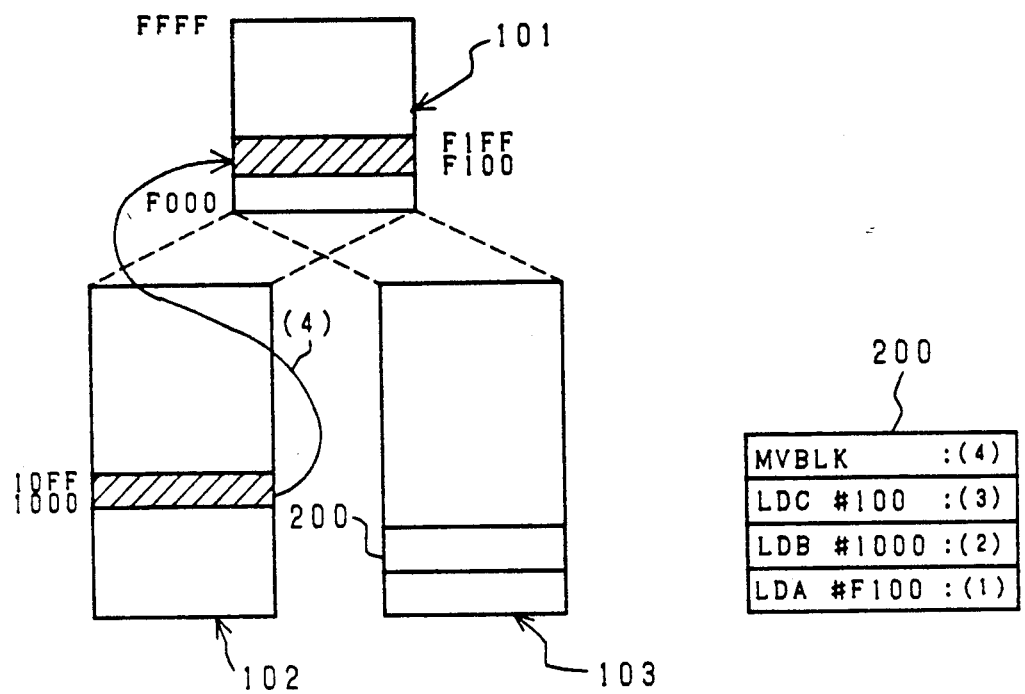
FIGS. 5A and 5B are memory maps showing the execution of a program to load an data block into the common space.
Figure 5B:
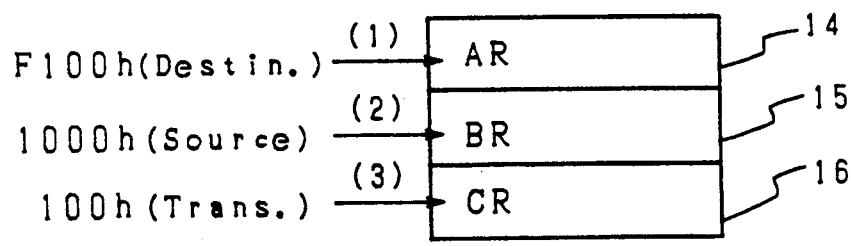

FIGS. 5A and 5B illustrate how a program can load data into the common space.

In FIG. 5A, a program 200 was previously stored in the instruction space (it could have been stored in the common space). The program transfers and stores in the common space a data block previously stored in the data exclusive space.

The instructions in the program 200 are executed in the order of (1) through (4) as shown in FIG. 5A. The instruction "MVBLK" is used to transfer a data block by using a destination address, a source address.., and a transfer range. As shown in FIG. 5B, the destination address is to be stored in the A register, the source address in the B register, and the transfer range in the C register.

In step (1), an instruction "LDA F100" loads F100h as the destination address into the A register. In step (2), an instruction "LDB 1000" loads 1000h as the source address into the B register. In step (3), an instruction "LDC 100" loads 100h as the transfer range into the C register. The data block is now defined to contain the data from the address 1000h (the source address stored in the B register) to the address 10FFh (a hatched range in FIG. 5A corresponding to the transfer range 100h stored in the C register).

In step (4), "MVBLK" transfers the data block from the data exclusive space to the common space. The data block now stored in the common space contains the data from the address F100h (the destination address stored in the A register) to the address F1FFh.

Figure 5C:
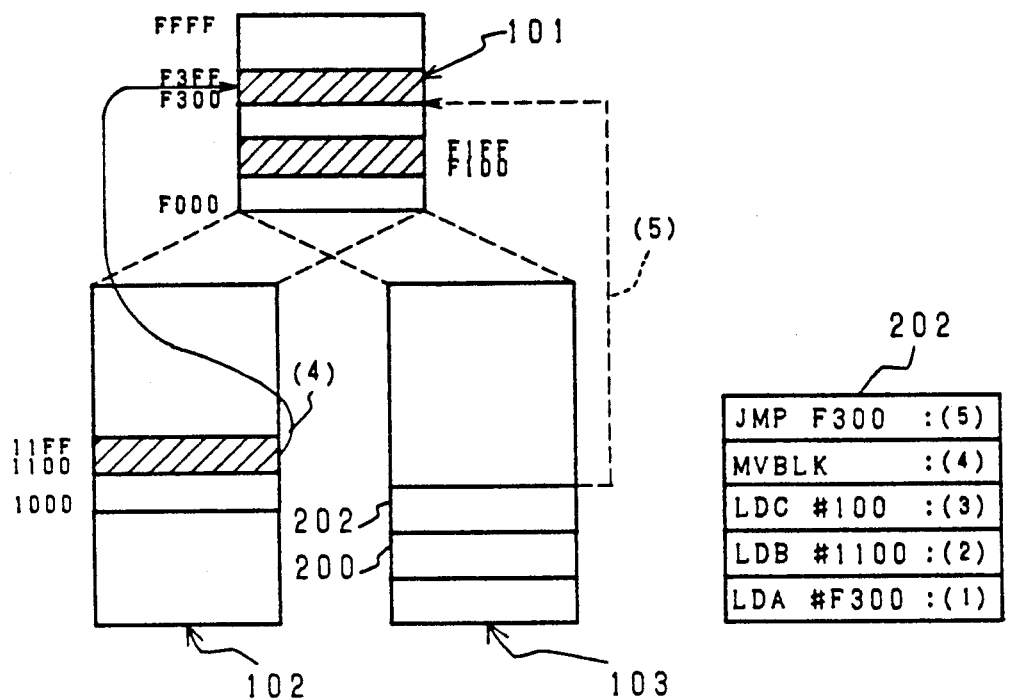
FIGS. 5C and 5D are memory maps showing the execution of a program to load an instruction block into common space, followed by the execution of that instruction block.
Figure 5D:
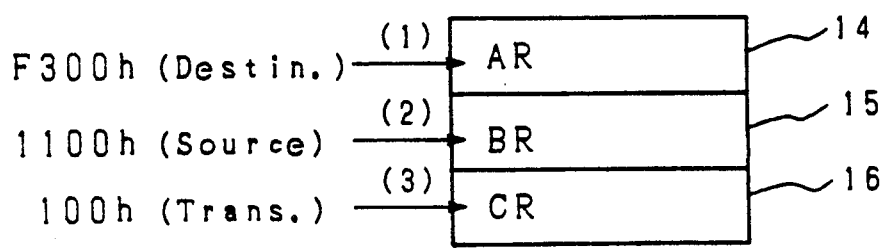

FIGS. 5C and 5D illustrate how a program can load instructions into the common space, then execute those instructions.

In FIG. 5C, a program 202 was previously stored in the instruction space (it could have been stored in the common space). The program first transfers and stores in the common space an instruction block previously stored in the data exclusive space. The program then fetches and executes the instruction block.

In step (1), an instruction "LDA F300" loads F300h as the destination address into the A register. In step (2), an instruction "LDB 1100" loads 1100h as the source address into the B register. In step (3), an instruction "LDC 100" loads 100h as the transfer range into the C register. The instruction block is now defined to contain the instructions from the address 1100h to the address 11FFh.

In step (4), "MVBLK" transfers the data block from the data space to the common space. The data block now stored in the common space 101 contains the data from the address F300h to the address F3FFh.

An instruction "JMP F300" in the last step (5) allows the program execution to jump from the instruction space to address F300h in the common space (the PC is set to address F300h). Thereafter, the instructions are fetched and executed starting with address F300h.

As shown above, the common space is extremely flexible. As a result the user can more efficiently and effectively utilize the memory space. The following figures show the hardware and steps used to achieve this flexibility.

Figure 6A:
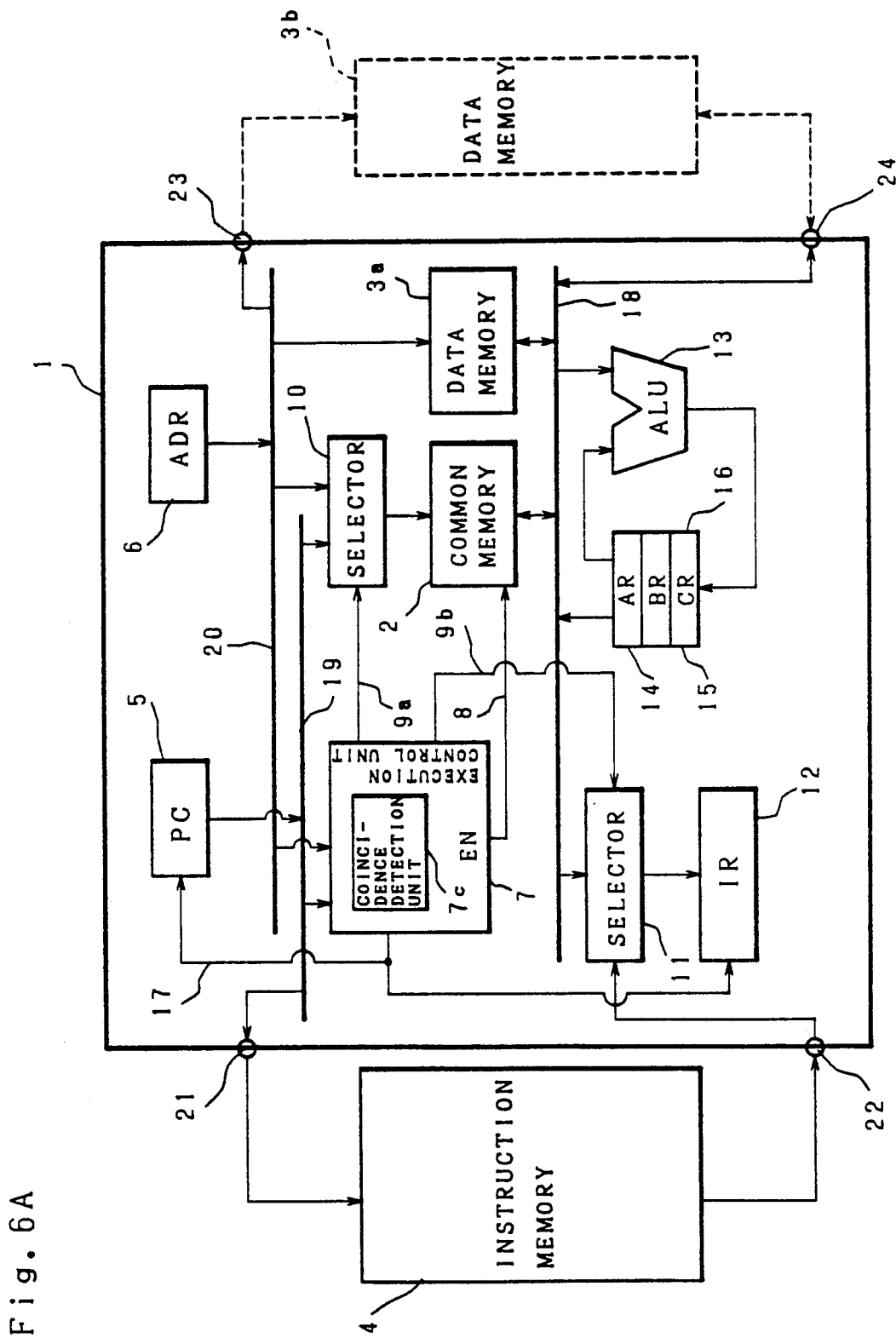
FIG. 6A is a block diagram of a first and a second preferred embodiment of the invention.

FIG. 6A is a block diagram depicting the architecture of a first and a second preferred embodiment of the invention.

In the drawing, a DSP 1 is implemented integrally on one chip, a data memory 3b is formed of a RAM outside the DSP (the exterior of the chip), and an instruction memory 4 is formed of a ROM outside the DSP.

A common memory 2 is comprised of a RAM and can have both a data space and an instruction space. The common memory exchanges data with a data bus 18.

A data memory 3a is comprised of a RAM. Once the data memory is given addresses from a data address bus 20, then the data memory exchanges data with the data bus 18.

A program counter 5 (hereinafter called "PC") specifies the address of the instruction to be fetched. The PC 5 outputs this instruction address to an instruction address bus 19.

An address register 6 (to be hereinafter called "ADR") designates the address of the data to be fetched. The ADR outputs this data address to a data address bus 20.

An execution control unit 7 includes therein a coincidence detection unit 7c. An enable signal line 8 is used for transferring an enable signal (to be hereinafter called "EN") from the execution control unit to the common memory. The execution control unit 7 uses data/instruction access lines 9a and 9b to instruct a address selector 10 and an instruction selector 11, respectively, whether the enable signal is for data access or instruction access. In the second preferred embodiment of the invention, the execution control unit 7 also uses a holding signal line 17 for transmitting a hold signal to the PC and an instruction register 12 (to be hereinafter called "IR").

The address selector 10 connects either the data address bus or the instruction address bus to the common memory. The instruction selector 11 similarly connects either the data bus or the instruction memory to the instruction register.

The IR 12 temporarily stores an instruction fetched from the instruction memory or the common memory.

An arithmetic logic unit 13 ("ALU") fetches data from the data bus and an A register 14, processes them, and stores the result in a C register 16.

The A register, a B register 15, and the C register store the processing results or the processing object of the ALU.

The data bus 18 is connected to the data memory, the ALU, the common memory, the A register, and the instruction selector. The instruction address bus 19 is connected to the address selector, the PC, and the execution control unit. The data address bus 20 is connected to a data memory, the ADR, the address selector and the execution control unit.

An instruction address pin 21 is connected to the input of the instruction memory outside the DSP. An instruction address pin 22 is connected to the output of the instruction memory outside the DSP. A data address pin 23 is connected to the input at the data memory outside the DSP. A data I/O pin 24 is connected to the input of the data memory outside the DSP.

Figure 6B:
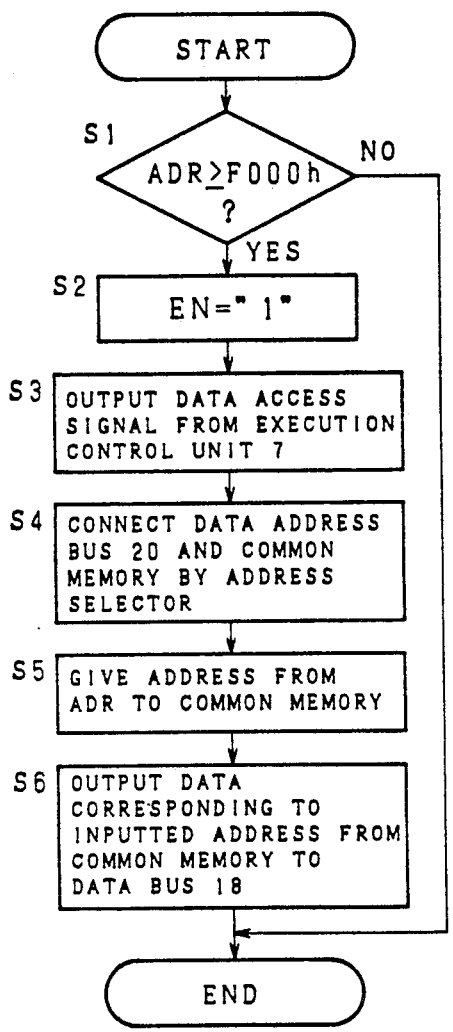
FIG. 6B is a flowchart showing the operation of the invention depicted in FIG. 6A when only the data is located in the common space.

FIG. 6B is a flowchart showing the operation of the invention as depicted in FIG. 6A when only the data to be fetched is in the common space.

The common space can be accessed by using the same instructions that are used to access the data exclusive space. If the data address being accessed (stored in the ADR) is greater than or equal to F000h, meaning that the data is located in the common space (step S1), the execution control unit transmits an EN="logical 1" signal (step S2) to the common memory through the EN signal line. As a result, the common memory is enabled for access.

The execution control unit then transmits a data access signal to the address selector through the data/instruction signal line (step S3). The address selector will then connect the data address bus to the common memory (step S4) so the address value in the ADR is transmitted to the common memory (step S5). The data in common space at the address given in ADR is now available for access by the data bus (step S6).

For example, if an instruction of "MV AR, @ XXXX" means write the data located at address XXXXh onto the A register, then an instruction of "MV AR, @ 0000" means that the data located at address 0000h of the data exclusive space is to be fetched and written onto the A register. If an instruction of "MV AR @ F000" is given, the data located at address F000h of the common space (common memory) is fetched and written onto the A register. Thus, the same instruction is used to access both the data exclusive space and the common space.

Figure 6C:
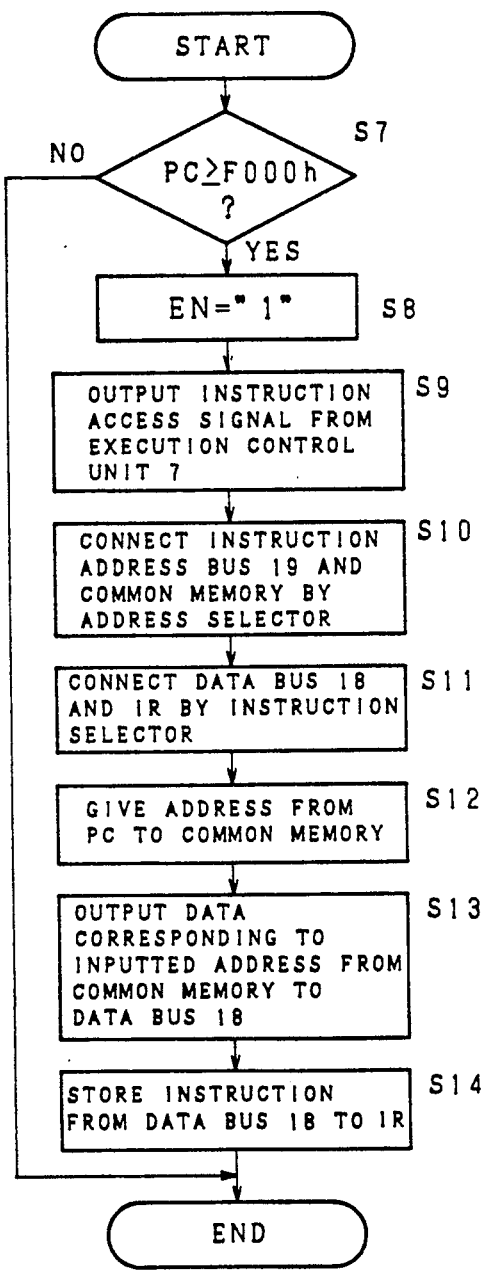
FIG. 6C is a flowchart showing the operation of the invention depicted in FIG. 6A when only the instruction is located in the common space.

FIG. 6C is a flowchart showing the operation of the invention as depicted in FIG. 6A when only the instruction to be fetched is in the common space.

The common space can be accessed by using the same instructions that are used to access the instruction exclusive space. If the instruction address being accessed (stored in the PC) is greater than or equal to F000h, meaning that the instruction is located in the common space (step S7), the execution control unit transmits an EN="logical 1" signal (step S8) to the common memory through the EN signal line. As a result, the common memory is enabled for access.

The execution control unit then transmits an instruction access signal to the address selector and the instruction selector through the data/instruction access signal lines 9a and 9b, respectively (step S9). The address selector will then connect the instruction address bus with the common memory (step S10) while the instruction selector will then connect the data bus with the IR (step S11). The address value in the PC is transmitted to the common memory (step S12). Hence, the instruction in the common memory at the address given in PC is now available for access by the data bus (step S13). Therefore, the instruction in the common memory at the address given in PC is transmitted on through the instruction selector to be stored in the IR (step S14).

For example, if the instruction "JMP XXXX" fetches instructions starting at address XXXX for execution then the instruction "JMP A000" fetches the instructions starting at address A000h in the instruction exclusive space for execution. If an instruction "JMP F000" is given, the instructions starting at address F000h in the common space are fetched for execution. Thus, the same instruction is used to access both the instruction exclusive space and the common space.

A difficulty with using a common space to store both data and instructions simultaneously is the conflict that occurs when both the data and instruction being fetched are stored in the common space. The first and second preferred embodiments shown in FIG. 6A use an execution control unit to handle these conflicts. In the first preferred embodiment, the execution control unit allows the instruction to be fetched while the data is set to a predetermined fixed value (e.g., all 0's) as a signal to the program that a conflict has occurred. In the second preferred embodiment, the execution control unit allows the data to be fetched first while the instruction fetch is held for one clock cycle. The the execution control unit then allows the instruction to be fetched the next clock cycle.

Figure 6D:
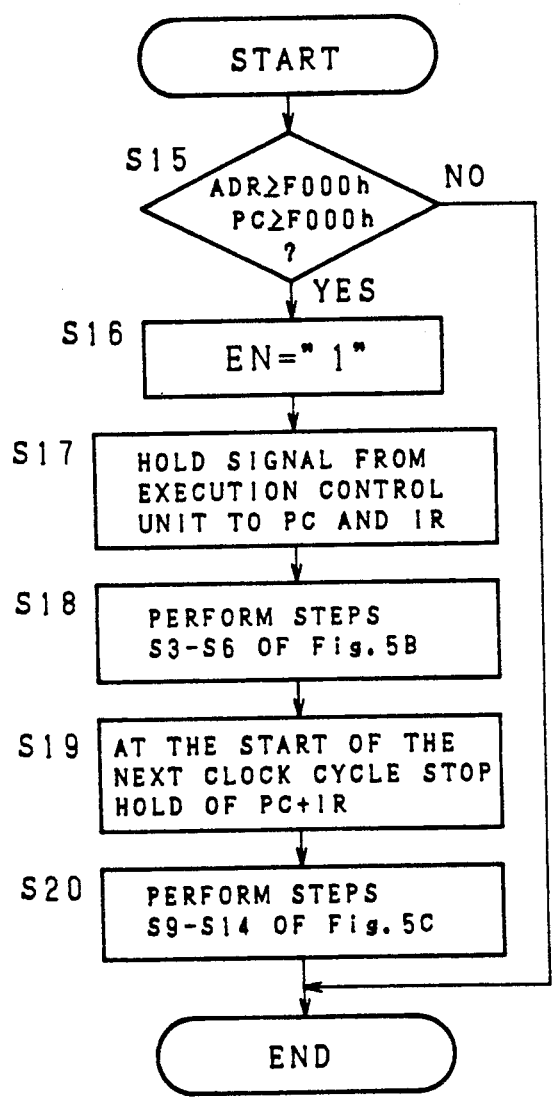
FIG. 6D is a flowchart showing the operation of the second preferred embodiment of the invention as depicted in FIG. 6A when both the instruction and the data are in the common space.

FIG. 6D is a flowchart showing the operation of the second preferred embodiment of the invention as depicted in FIG. 6A when both the instruction and the data to be fetched are in the common space.

If both the data address (stored in the ADR) and the instruction address (stored in the PC) being accessed are greater than or equal to F000h, meaning that both the data and instruction are located in the common space (step S15), the execution control unit transmits an EN="logical 1" signal (step S16) to the common memory through the EN signal line. As a result, the common memory is enabled for access.

The execution control unit then performs a series of steps. A hold signal is transmitted on the hold signal line to instruct the PC and the IR to hold (step S17). Then steps S3 to S6 from FIG. 6B, are performed (step S18). At the end of the clock cycle after step S18 is performed, the execution control unit turns off the hold signal transmitted to the PC and the IR (step S19). Then steps S9 to S14 from FIG. 6C are performed (step S20).

Figure 7:
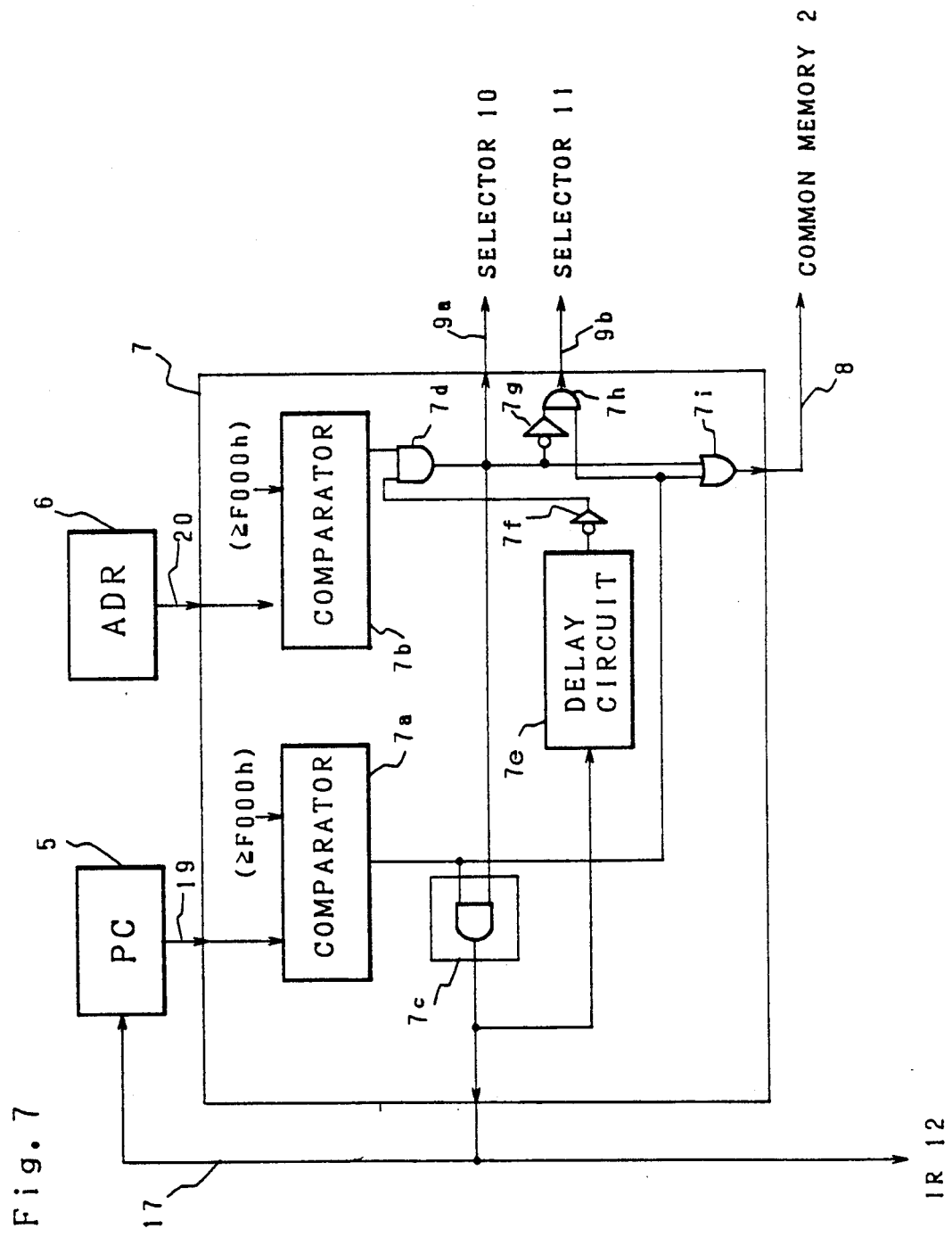
FIG. 7 is a circuit diagram illustrating the execution control unit depicted in FIG. 6A.

FIG. 7 is a circuit diagram depicting a preferred embodiment of the execution control unit 7. The execution control unit is connected to the PC 5, the ADR 6, the IR 12, the address selector 10, the instruction selector 11, and common memory 2. The execution control unit circuit includes the coincidence detection unit 7c (an AND gate), comparators 7a and 7b, AND gates 7d and 7h, inverters 7f and 7g, OR gate 7i, and delay circuit 7e.

The PC 5 transmits the address of the next instruction to be fetched on the instruction address bus 19 to the comparator 7a. The comparator 7a compares the instruction address to a hard-wired F000h input. If the instruction address is greater than or equal to F000h, meaning that the instruction is located in common memory, then the comparator 7a sends a 5 logical "1" to the coincidence detection unit, the AND gate 7h, and the OR gate 7i. If the instruction address is less than F000h, meaning that the instruction is not located in external instruction memory, then the comparator 7a sends a logical "0" to the same gates.

The ADR 6 transmits the address of the next data item to be fetched from memory on the data address bus 20 to the comparator 7b. The comparator 7b compares the data address to a hard-wired F000h. If the data address is greater than or equal to F000h, meaning that the data is located in common memory, the comparator 7b transmits a "logical 1" to the AND gate 7d. If the data address is less than F000h, meaning that the data is located in either internal or external data memory, then the comparator 1a transmits a logical "0" to the same gate.

The coincidence detection unit 7c is an AND gate with two inputs, from the comparator 7a and from the AND gate 7d. The output of the coincidence detection unit is transmitted internally to the delay circuit 7e, and externally as a holding signal on the holding signal line 17 to the PC and the IR. If there is a coincidence (i.e, both the instruction and data to be fetched are located in common memory), then the PC and IR are held for one clock cycle while the data is fetched. This results in the data fetch getting priority over the instruction fetch.

The delay circuit 7e has only one input, from the coincidence detection unit 7c. The delay circuit 7e output, which is sent to the inverter 7f, is the same as the coincidence detection unit 7c output one clock cycle before. The inverter 7f inverts this signal and transmits it to the AND gate 7d. This delay and invert process is critical for the proper handling of conflicting fetches.

The AND gate 7d has two inputs, from the comparator 7b and the inverter 7f. The output of the AND gate 7d is transmitted internally to the inverter 7g and OR gate 7i, and externally on the data/instruction access signal line 9a as a select signal to the address selector. This instructs the address selector which address, the data or the instruction, is to be fetched from the common memory. The inverter 7g inverts this signal and sends it to the input of the AND gate 7h.

The AND gate 7h has two inputs, from the inverter 7g and from the comparator 7a. The AND gate 7h output is transmitted externally on the instruction memory/common memory signal line 9b as a select signal to the instruction selector. This signal instructs the instruction selector whether the next instruction is from the common space or the exclusive instruction space.

The OR gate 7i has two inputs, from the comparator 7a and from the AND gate 7d. The OR gate output is transmitted externally on the enable signal line 8 as an enable signal to the common memory. The enable signal tells the common memory whether or not it is being accessed.

Figure 8:
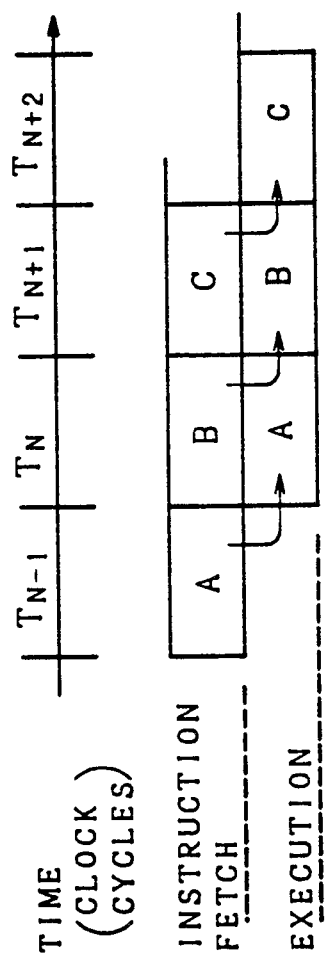
FIG. 8 is a timing chart showing the second preferred embodiment performing two steps of pipelining.

FIG. 8 is a timing diagram that shows the pipelining of the fetches of instructions and the execution thereof. During time period (or clock cycle) $T_N-1$, instruction A was fetched. During time period $T_N$, instruction B was fetched while instruction A was executed. During time period $T_{N+1}$, instruction C was fetched while instruction B was executed. This process can continue indefinitely until a conflict occurs during the fetching of instructions and data. A conflicting fetch occurs when both the instruction and data being fetched are located in the common space.

Figure 9:
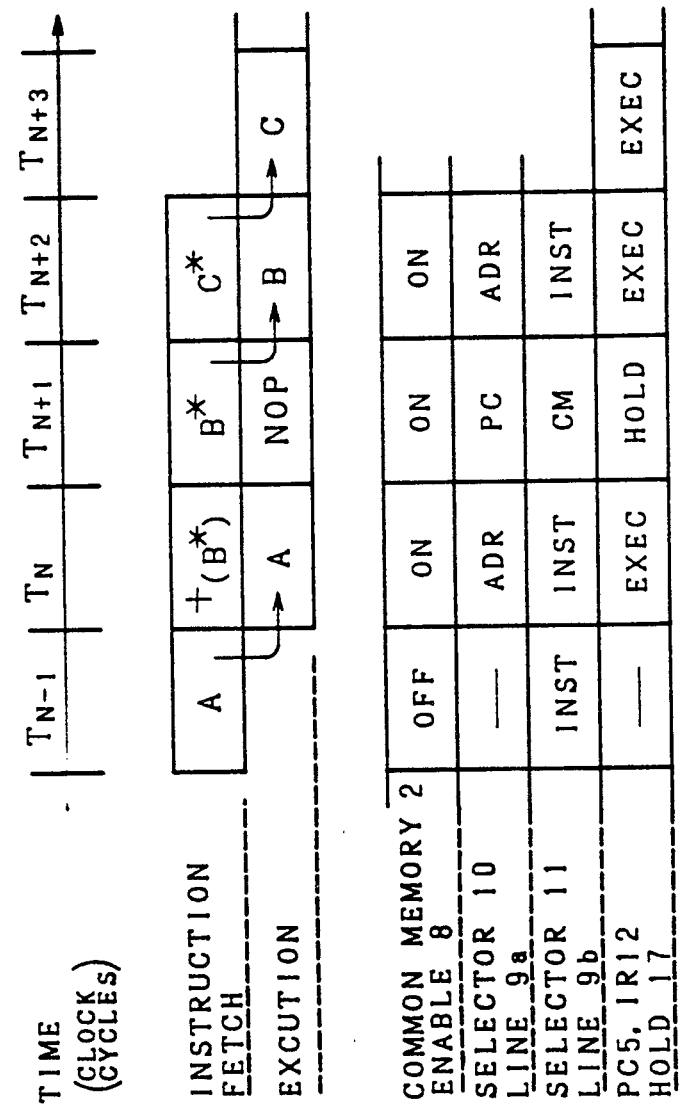
FIG. 9 is a timing chart showing operation of the second preferred embodiment to avoid simultaneous access of the common space during the two steps of pipelining.

FIG. 9 is a timing diagram that shows the pipelining of the fetches of instructions and the execution thereof for the second preferred embodiment when there are conflicting fetches.

During time period $T_N-1$ neither the instruction nor the data to be fetched are in common memory 2. Hence, there is no conflict. The common memory will not be used.

To accomplish the above during $T_N-1$, the execution control unit transmits the following signals. An OFF (logical "0") signal is transmitted on the enable signal line to tell the common memory that it is not being used. An INST (logical "0") is transmitted on the instruction memory/common memory signal line to instruct the instruction selector that the instruction is not being fetched from common memory.

During time period $T_N$ both the instruction and the data to be fetched are in the common memory. Hence, there is a conflict. The instruction to be fetched will be delayed one clock cycle while the data is fetched. The PC will be stopped from incrementing for one clock cycle to preserve the instruction address. The common memory will use the address given on the ADR. The instruction fetched during the previous time period will be executed.

To accomplish the above during $T_N$ the execution control unit transmits the following signals. An ON (logical "1") signal is transmitted on the enable signal line to instruct the common memory that it is being used. An ADR (logical "1") signal is transmitted on the data/instruction signal line to instruct the address selector that the ADR is to be connected to the common memory. An INST (logical "0") signal is transmitted on the instruction memory/common memory signal line to instruct the instruction selector that the instruction is not being fetched from common memory. An EXEC (logical "0") signal is transmitted on the hold signal line to tell the PC and the IR not to hold.

During time period $T_{N+1}$, the instruction to be fetched is in common memory. The common memory will use the address stored in the PC. In addition, the execution of instructions will be delayed for one clock cycle.

To accomplish the above during $T_{N+1}$, the execution control unit transmits the following signals. An ON (logical "1") signal is transmitted on the enable signal line to instruct the common memory that it is being used. A PC (logical "0") signal is transmitted on the data/instruction signal line to instruct the address selector that the PC is to be connected to the 15 common memory A CM (logical "1") signal is generated on the instruction memory/common memory signal line to tell the instruction selector that the instruction is being fetched from the common memory. A HOLD (logical "1") signal is generated on the hold signal line to tell the PC and the IR to hold. In addition, there is no instruction to execute so no operation (NOP) is performed.

During time period $T_{N+2}$, the instruction to be fetched is in common memory but the data is not. Hence, there is no conflict. The common memory will use the address given on the PC. The instruction fetched during $T_{N+1}$ will be executed.

To accomplish the above during $T_{N+2}$, the execution control unit transmits the following signals. An ON (logical "1") signal is transmitted on the enable signal line to tell the common memory that it is being used. An ADR (logical "1") signal is transmitted on the data/instruction signal line to instruct the address selector that the ADR is to be connected to the common memory. An INST (logical "0") signal is transmitted on the instruction memory/common memory signal line to instruct the instruction selector that the instruction is not being fetched from common memory. An EXEC (logical "0") signal is transmitted on the hold signal line to instruct the PC and the IR not to hold.

Accordingly, in the second embodiment, the execution of an instruction may be delayed one machine cycle. The following two embodiments provide other alternative pipelining methods that avoid these delays.

Figure 10:
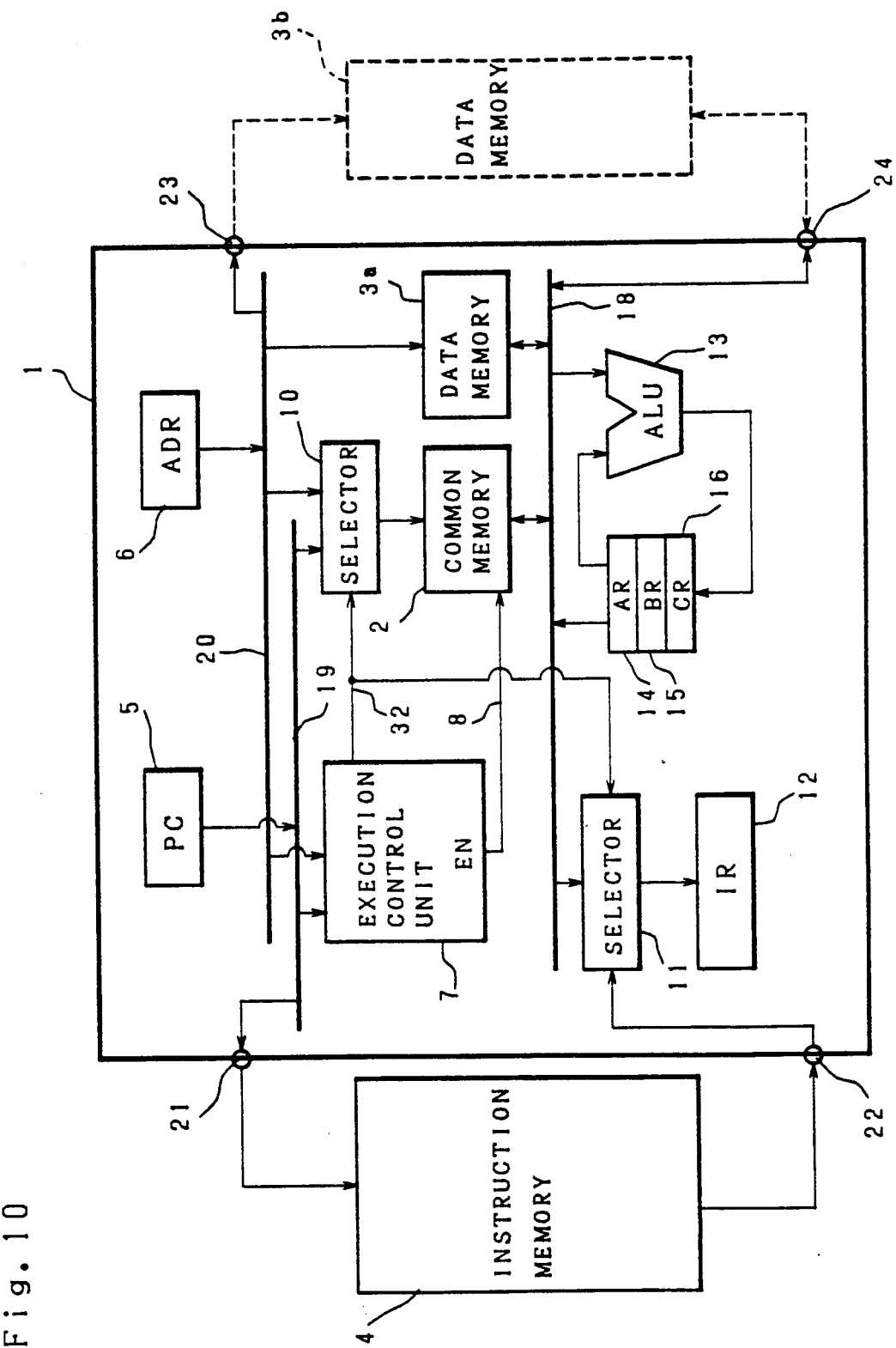
FIG. 10 is a block diagram of a third preferred embodiment of the invention utilizing a time-sharing methodology.

FIG. 10 is a block diagram of a third preferred embodiment of the invention.

This embodiment utilizes a time-sharing pipelining methodology. Only one clock cycle is needed for fetching both a data and an instruction from any combination of the common space, the data exclusive space, or the instruction exclusive space. The machine cycle is divided into two halves. During the first half of the clock cycle, the data is fetched from the common space or the data exclusive space while the instruction fetch is inhibited. During the second half of the clock cycle, the instruction is fetched from the common space or the instruction exclusive space while the data fetch is inhibited. As a result, there are no conflicting fetches.

In FIG. 10, reference numeral 32 designates an access signal line for transmitting a switching signal (to be hereinafter called the "access switching signal") from the execution control unit 7 to the address selector 10 and the instruction selector 11. This signal is used for switching the data access or the instruction access with respect to the common space. The execution unit does not include the coincidence detection unit 7c as provided in the first and second embodiments shown in FIG. 6A.

The execution control unit generates the access switching signal for data access during the first half of the clock cycle and for instruction access during the second half of the clock cycle. The switching signal is transmitted to the selectors 10 and 11 through the access switching signal line 32. Based on the access switching signal, the address selector 10 connects the common memory to the ADR during the first half of the clock cycle and to the PC during the second half of the clock cycle. Other parts of the third embodiment are the same as those in the first and second embodiments.

Figure 11:
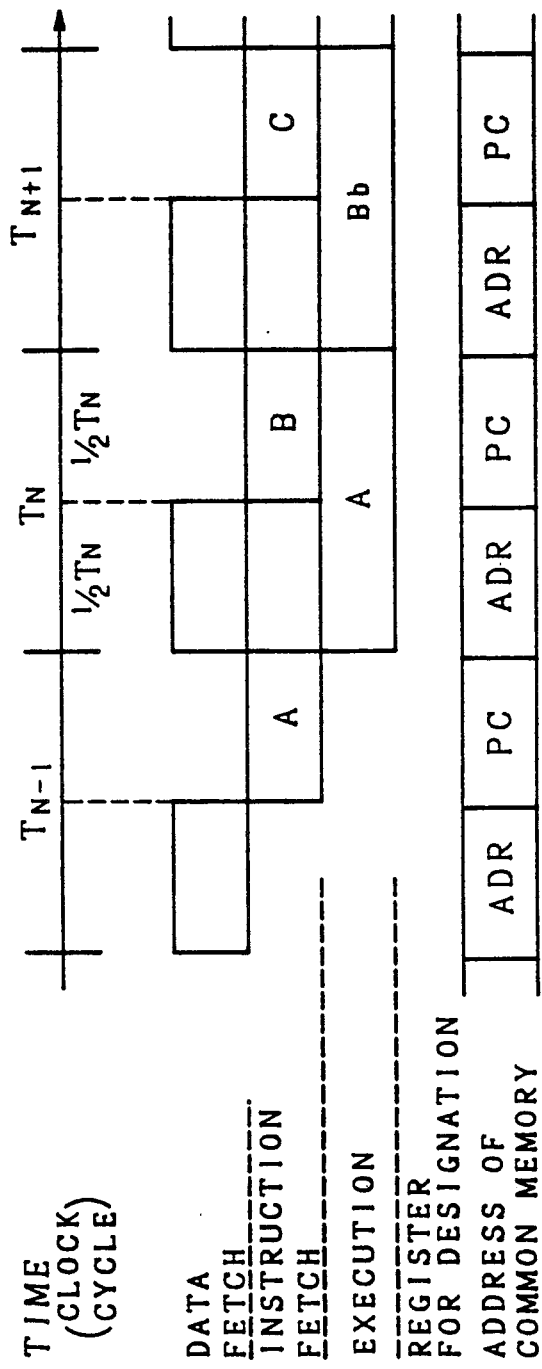
FIG. 11 is a timing chart showing the operation of the embodiment shown in FIG. 10.

FIG. 11 is a timing chart showing the operation of the third embodiment of the invention. During the first half of time period $T_N$ the data is fetched while the fetch of the instruction B is inhibited. During the second half of the time period $T_N$, the instruction B is fetched while the data fetch is inhibited. Also, during the whole time period $T_N$, the instruction A and the data are executed while the fetches are occurring. In other words, in the second embodiment, execution of the preceding instruction/data A and fetch of the following instruction/data B are carried out within the same clock cycle (time period $T_N$ in FIG. 11). Accordingly, there is no one clock cycle delay as seen in the second embodiment shown in FIG. 6D.

Figure 12:
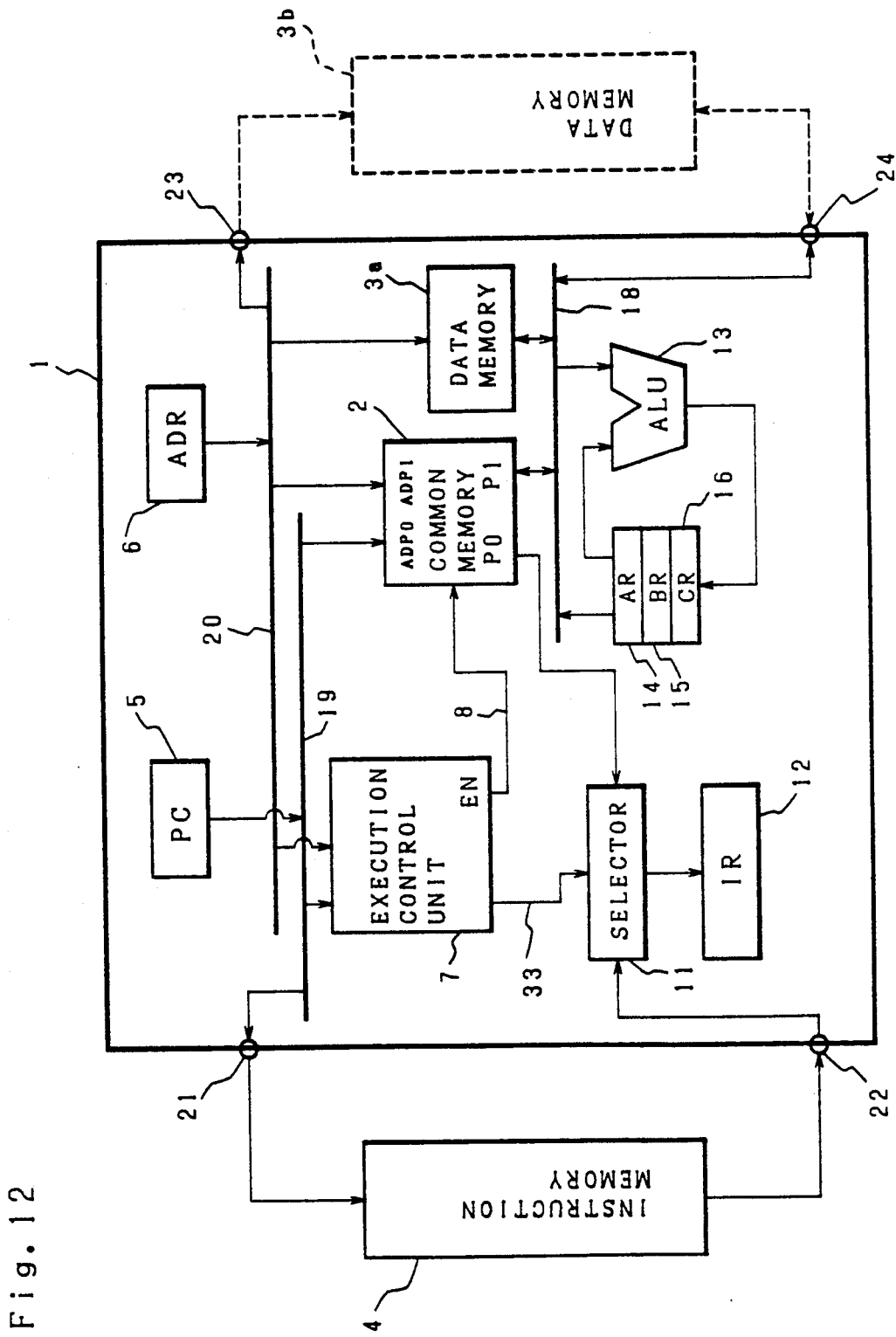
FIG. 12 is a block diagram of a fourth preferred embodiment of the invention utilizing a two-port common space.

FIG. 12 is a block diagram showing the fourth embodiment of the invention. This embodiment utilizes a common memory 2 consisting of a two port RAM. This two port RAM has two data output ports P0 and P1, and two address input ports. ADP0 and ADP1.

The execution control unit 7 transmits an instruction access signal to the instruction selector 11 on an instruction access signal line 33. This signal indicates that an instruction was fetched from the common memory. The inputs to the common memory are at the ports ADP0 and ADP1 from the instruction address bus 19 and the data address bus 20 respectively. The outputs from the common memory are at the ports P0 and P1 to the instruction selector and the data bus 18 respectively.

When an instruction is to be fetched from the common space, the execution control unit transmits an instruction access signal. This signal is transmitted to the instruction selector through the instruction access signal line 33. When the instruction selector receives the signal, it connects the port P0 of the common memory to the IR. Meanwhile, any fetch of data from the common space is transmitted to the data bus 18 from the port P1 of the common memory. Therefore, even when the instruction and data are simultaneously fetched, there is no one clock cycle delay as shown in the second embodiment in FIG. 6D.

The invention has now been described with reference to several preferred embodiments. Alternative circuitry for accomplishing the functions of the circuits described in the above figures may be utilized to implement the invention. For example the microprocessor could leave out all mechanisms for handling conflicting fetches and rely upon the instructions being written so no conflict occurs.

Accordingly, the scope and breadth of the present invention is defined by the appended claims.

What is claimed is:

1. In a microprocessor chip of the type utilizing a memory characterized by a memory map divided into separate data and instruction address spaces, and having separate data and instruction address buses for providing data and instruction addresses, respectively, to data and address stores, with the data store accessed by addresses in the separate data address space and with the instruction store accessed by addresses in the separate instruction address space, a program counter for providing an instruction address for an instruction to be fetched from the instruction space during a given instruction fetch cycle and for incrementing the instruction address prior to the beginning of a subsequent instruction fetch cycle, an address register for providing a data address, with both the instruction fetch and the data fetch being able to occur in a given clock cycle when the instruction and data to be fetched are stored in the instruction and data stores, an instruction register for storing a fetched instruction, data registers for storing the fetched data, and a system for implementing high speed execution of a series of instructions comprising:

(a) an internal RAM, included on the microprocessor chip and having an address port and a data port, with the internal RAM accessed by addresses in a common memory space;

(b) a first data selector for controllably connecting the program counter to the address port of the internal RAM when the instruction address is located in the common address space, or for controllably connecting the address register to the address port of the internal RAM when the data address is located in the common address space;

(c) a second data selector for controllably connecting the internal RAM with the instruction register for the storage of the instruction fetched from the internal RAM when the instruction address is located in the common address space; and (d) means for controllably connecting the internal RAM with the data registers for the storage of the data fetched from the internal RAM when the data address is located in the common address space.

2. The microprocessor chip of claim 1 wherein the system for implementing high speed execution of a series of instructions further comprises:

means for handling conflicting fetches of data and instructions when the addresses of both the data and the instruction to be fetched during the given clock cycle are located in the common address space.

3. The system of claim 2 wherein the means for handling conflicting fetches of data and instructions comprises:

(a) a conflict detection unit for detecting when addresses of both the data and the instruction to be fetched during the given clock cycle are located in the common address space (b) and, when a conflict is detected, for controllably connecting the program counter to the address port of the common space and for providing a data element having a predetermined value to indicate that a conflict has occurred.

4. The system of claim 2 wherein the means for handling conflicting fetches of data and instructions comprises:

(a) a conflict detection unit for detecting when the addresses of both the data and the instruction to be fetched during the given clock cycle are located in the common space; and (b) means, when a conflict is detected, for holding the program counter and the instruction register until the data is fetched from the internal RAM, and for then releasing the program counter and the instruction register to fetch the instruction from the internal RAM.

5. The system of claim 2 wherein the means for handling conflicting fetches of data and instructions comprises:

means for automatically connecting the address register to the internal RAM for any fetching of data during a first half of a clock cycle, and for automatically connecting the program counter to the internal RAM for any fetching of instructions during a second half of the clock cycle.

6. In a microprocessor chip of the type utilizing a memory characterized by a memory map divided into separate data and instruction address spaces, and having separate data and instruction address buses for providing data and instruction addresses, respectively, to data and address stores, with the data store accessed by addresses in the separate data address space and with the instruction store accessed by addresses in the separate instruction address space a program counter for providing an instruction address for an instruction to be fetched from the instruction space during a given instruction fetch cycle and for incrementing the instruction address prior to the beginning of a subsequent instruction fetch cycle, an address register for providing a data address, with both the instruction fetch and the data fetch being able to occur in a given clock cycle when the instruction and data to be fetched are stored in the instruction and data stores, an instruction register for storing a fetched instruction, data registers for storing the fetched data, and a system for implementing high speed execution of a series of instructions comprising:

a internal RAM, included on the microprocessor chip and including first and second address ports for receiving addresses and first and second data ports for receiving data with said internal RAM accessed by addresses in a common address space;

means for coupling the first address port to the program counter and the first data port to the instruction register when the address of the instruction to be fetched is in the common address space; and means for coupling the address register to the second address port and the second data port to the data registers when the address of data to be fetched in the common address space.

7. In a microprocessor chip of the type utilizing a memory characterized by a memory map divided into separate data and instruction address spaces, and having separate data and instruction address buses for providing data and instruction addresses, respectively, to data and address stores, with the data store accessed by addresses in the separate data address space and with the instruction store accessed by addresses in the separate instruction address space a program counter for providing an instruction address for an instruction to be fetched from the instruction space during a given instruction fetch cycle and for incrementing the instruction address prior to the beginning of a subsequent instruction fetch cycle, an address register for providing a data address, with both the instruction fetch and the data fetch being able to occur in a given clock cycle when the instruction and data to be fetched are stored in the instruction and data stores, an instruction register for storing a fetched instruction, data registers for storing the fetched data, and a system for implementing high speed execution of a series of instructions comprising:

(a) an internal RAM, included on the microprocessor chip and having an address port and a data port, with the internal RAM accessed by addresses in a common memory space;

(b) a first data selector for controllably connecting the program counter to the address port of the internal RAM when the instruction address is located in the common address space, or for controllably connecting the address register to the address port of the internal RAM when the data address is located in the common address space;

(c) a second data selector for controllably connecting the internal RAM with the instruction register for the storage of the instruction fetched from the internal RAM when the instruction address is located in the common address space;

(d) means for controllably connecting the internal RAM with the data registers for the storage of the data fetched from the internal RAM when the data address is located in the common address space;

(e) a conflict detection unit for detecting when the addresses of both the data and the instruction to be fetched during the given clock cycle are located in the common address space; and (f) means, when a conflict is detected, for controllably connecting the program counter to the address port of the internal RAM and for providing a data element set to a predetermined value to indicate that a conflict has occurred.

8. In a microprocessor chip of the type utilizing a memory characterized by a memory map divided into separate data and instruction address spaces, a program counter providing an instruction address for an instruction to be fetched from the instruction space during a given instruction fetch cycle and for incrementing the instruction address prior to the beginning of a subsequent instruction fetch cycle, an address register for storing a data address to fetch data from the data space, with both the instruction fetch and the data fetch being able to occur in a given clock cycle when both the instruction and data to be fetched are stored in the memory, an instruction register for storing the instruction fetched form the instruction space, data registers for storing the data fetched from the data space, an internal RAM, included on the microprocessor chip and including an address port and a data port, with the internal RAM accessed by addresses in a common address space; a method for implementing high speed execution of a series of instructions, comprising the steps of:

(a) connecting the program counter to the address port of the internal RAM when the instruction address is located in the common address space to fetch an instruction from the internal RAM;

(b) connecting the data port of the internal RAM with the instruction register for the storage of the instruction fetched from the common space when the instruction address is located in the common space;

(c) connecting the address register to the address port of the internal RAM when the data address is located in the common address space; and (d) connecting the data port of the internal RAM with the data registers for the storage of the data fetched from the internal RAM when the data address is located in the common address space.

9. The microprocessor chip of claim 8 where the method for implementing high speed execution of a series of instructions further comprises:

handling conflicting fetches of data and instructions when the addresses of both the data and the instruction to be fetched during the given clock cycle are located in the common address space.

10. The method of claim 9 wherein the step for handling conflicting fetches of data and instructions comprises:

(a) detecting when the addresses of both the data and the instruction to be fetched during the given clock cycle are located in the common address space; and (b) fetching the instruction and providing a data element equal to a predetermined value to indicate that a conflict has occurred.

11. The method of claim 9 wherein the step of handling conflicting fetches data and instructions comprises:

(a) detecting when the addresses of both the data and the instruction to be fetched during the given clock cycle are locate in the common address space;

(b) holding the program counter and the instruction register until the data is fetched from the internal RAM; and (c) releasing the program counter and the instruction register after the instruction is fetched from the internal RAM.

12. The method of claim 9 wherein the step of handling conflicting fetches of data and instructions comprises:

(a) automatically connecting the address register to the internal RAM for any fetching of data during a first half of a clock cycle; and (b) automatically connecting the program counter to the internal RAM for any fetching of instructions during a second half of the clock cycle.

13. In a microprocessor chip of the type utilizing a memory characterized by a memory map divided into separate data and instruction address spaces, a program counter providing an instruction address for an instruction to be fetched from the instruction space during a given instruction fetch cycle and for incrementing the instruction address prior to the beginning of a subsequent instruction fetch cycle, an address register for storing a data address to fetch data from the data space, with both the instruction fetch and the data fetch being able to occur in a given clock cycle when both the instruction and data to be fetched are stored in the memory, an instruction register for storing the instruction fetched form the instruction space, data registers for storing the data fetched from the data space, an internal two-port RAM, included on the microprocessor chip and including first and second address ports and first data port, with the internal RAM accessed by addresses in a common address space; a method for implementing high speed execution rate of a series of instructions, comprising the steps of:

coupling the first address port to the program counter and the first data port to the instruction register when the address of the instruction to be fetched is in the common address space; and coupling the address register to the second address port and the second data port to the data registers when the address of data to be fetched is in the common address space.

* * * * *